(12) United States Patent
Chen et al.

(10) Patent No.: US 10,802,605 B2
(45) Date of Patent: Oct. 13, 2020

(54) INPUT METHOD, DEVICE, AND ELECTRONIC APPARATUS

(71) Applicant: BEIJING SOGOU TECHNOLOGY DEVELOPMENT CO., LTD., Beijing (CN)

(72) Inventors: Xiaoshuai Chen, Beijing (CN); Mansuer Maerhufu, Beijing (CN); Yang Zhang, Beijing (CN)

(73) Assignee: BEIJING SOGOU TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/461,547

(22) PCT Filed: Aug. 17, 2017

(86) PCT No.: PCT/CN2017/097867
§ 371 (c)(1),
(2) Date: May 16, 2019

(87) PCT Pub. No.: WO2018/090688
PCT Pub. Date: May 24, 2018

(65) Prior Publication Data
US 2019/0294257 A1  Sep. 26, 2019

(30) Foreign Application Priority Data
Nov. 17, 2016 (CN) .......................... 2016 1 1019644

(51) Int. Cl.
*G06F 3/023* (2006.01)
*G06F 16/00* (2019.01)
*G06F 40/274* (2020.01)

(52) U.S. Cl.
CPC ............ *G06F 3/0233* (2013.01); *G06F 3/023* (2013.01); *G06F 16/00* (2019.01); *G06F 40/274* (2020.01)

(58) Field of Classification Search
CPC ...... G06F 3/0233; G06F 3/023; G06F 16/274; G06F 40/274
See application file for complete search history.

(56) References Cited

U.S. PATENT DOCUMENTS

| 9,779,459 B2* | 10/2017 | Biltz | ..................... G06Q 50/01 |
| 2013/0246225 A1* | 9/2013 | Biltz | ..................... G06Q 50/01 705/27.1 |

(Continued)

FOREIGN PATENT DOCUMENTS

| CN | 101183281 A | 5/2008 |
| CN | 101373468 A | 2/2009 |

(Continued)

OTHER PUBLICATIONS

The World Intellectual Property Organization (WIPO) International Search Report for PCT/CN2017/097867 dated Nov. 22, 2017 4 Pages.

*Primary Examiner* — Peter D McLoone
(74) *Attorney, Agent, or Firm* — Anova Law Group, PLLC

(57) ABSTRACT

An input method, an input device, and an electronic apparatus are disclosed by embodiments of the present disclosure. The input method comprises: obtaining an input operation; determining an input content corresponding to the input operation; determining input candidates matching the input content based at least on one or more keywords included in an adaptive lexicon. The one or more keywords included in the adaptive lexicon are determined according to a current page content of the electronic apparatus. The embodiments of the present disclosure achieve the technical effect of being able to provide more accurate input candidates.

17 Claims, 4 Drawing Sheets

(56) References Cited

U.S. PATENT DOCUMENTS

| | | | |
|---|---|---|---|
| 2014/0337989 A1* | 11/2014 | Orsini | G06F 40/40 726/26 |
| 2018/0067919 A1* | 3/2018 | Ning | G06F 3/04886 |
| 2018/0267955 A1* | 9/2018 | Catalano | G06F 40/242 |
| 2019/0220511 A1* | 7/2019 | Zheng | G06F 3/0237 |
| 2019/0220513 A1* | 7/2019 | Xin | G06F 40/56 |

FOREIGN PATENT DOCUMENTS

| | | |
|---|---|---|
| CN | 102685224 A | 9/2012 |
| CN | 105718071 A | 6/2016 |
| CN | 105760521 A | 7/2016 |

\* cited by examiner

INPUT METHOD, DEVICE, AND ELECTRONIC APPARATUS

CROSS-REFERENCE TO RELATED APPLICATIONS

This application is a national phase entry under 35 U.S.C. § 371 of International Application No. PCT/CN2017/097867, filed on Aug. 17, 2017, which claims priority to Chinese Application No. 201611019644.0, titled "Input Method, Device, and Electronic Apparatus" and filed on Nov. 17, 2016 with the Chinese Patent Office, the entire contents of which are hereby incorporated by reference.

TECHNICAL FIELD

The present disclosure generally relates to the field of computers and, more particularly, relates to an input method, device, and an electronic apparatus.

BACKGROUND

With the continuous development of science and technology, electronic technology has also developed rapidly. There are more and more types of electronic products. For example, electronic apparatuses such as laptops, desktop computers, smart phones, and tablets have become an important part of people's lives. Users can use the electronic apparatuses for work and recreation anytime and anywhere, and enjoy the convenience brought by the technology development.

Electronic apparatuses generally have an input function. After a user starts the input method application, the corresponding input candidates can be provided based on the user's input content. User-based input is usually matched in the input method lexicon to obtain corresponding input candidates. For different input scenarios (e.g. searching for TV shows, replying to emails, inputting documents, or the like), the matched input candidates based on the input content are the same. That is, input candidates do not take into account the difference of input scenarios. However, depending on different input scenarios, input candidates that the user wishes to obtain are not the same based on the same input content. For example, for the input scenario of searching for a TV show, the user prefers to be provided with input candidates related to the TV show. For the input scenario of replying to the mailbox, the user prefers to be provided with input candidates related to the mail. For the input scenario of inputting a document, the user prefers to be provided with input candidates for the document. It can be seen that there are technical problems that input candidates provided in the existing technologies are not accurate enough.

SUMMARY OF THE DISCLOSURE

The present disclosure provides an input method, an input device, and an electronic apparatus to solve the technical problem that the input candidates provided by the input operation are not accurate enough in the existing technologies.

The first aspect of the present disclosure provides an input method. The method includes: obtaining an input operation; determining the input content corresponding to the input operation; and determining input candidates that match the input content based at least on one or more keywords included in an adaptive lexicon, wherein keywords included in the adaptive lexicon are determined based on the current page content of the electronic apparatus.

In conjunction with the first aspect, in the first possible implementation manner, the method further includes: obtaining the current page content, and extracting, from the current page content, keywords having word frequency meeting a preset word frequency requirement, and adding the keyword meeting the preset rule to the adaptive lexicon; or obtaining the adaptive lexicon from a server based on the identification information of the current page content.

In conjunction with the first possible implementation manner of the first aspect, in the second possible implementation manner, extracting the keywords that meet preset rules from the current page content includes: extracting keywords having word frequencies greater than a preset word frequency from among keywords included in the current page content as the keywords meeting the preset rule; and/or extracting keywords of a preset category from among keywords included in the current page content as the keywords meeting the preset rule.

In conjunction with the second possible implementation manner of the first aspect, in the third possible implementation manner, before extracting the keywords having word frequencies greater than a preset word frequency from among the keywords included in the current page content as keywords meeting the preset rule, the method further includes: identifying synonyms for each keyword; and adjusting the word frequencies of the corresponding keywords based on the synonyms of each keyword.

In conjunction with the third possible implementation manner of the first aspect, in the fourth possible implementation manner, the word frequency of a keyword is adjusted using the following formula:

$$f = cA + \sum_{i=1 \sim N} c_i * A_i$$

where f represents the word frequency of the adjusted keyword, cA represents the word frequency of the keyword before adjustment, $c_i$ represents the similarity value between the keyword and the ith synonym, $A_i$ represents the word frequency of the ith synonym, and N represents the number of synonyms for the keyword.

In conjunction with the second possible implementation manner of the first aspect, in the fifth possible implementation manner, the method further includes: separating the current page content by at least two word segmentation tools to obtain at least two word segmentation results corresponding to the at least two word segmentation tools, respectively; and merging the at least two word segmentation results to obtain keywords included in the current page content.

In conjunction with the second possible implementation manner of the first aspect, in the sixth possible implementation manner, obtaining the current page content includes: obtaining the page content of the electronic apparatus that is currently in an open state; or obtaining the page content of the electronic apparatus that is currently in an operated state.

In conjunction with the first aspect or any one of the first to the six possible implementation manners of the first aspect, in the seventh possible implementation manner, determining input candidates matching the input content based at least on the one or more keywords includes: obtaining at least one keyword by matching the input content in a default lexicon; adjusting the recommendation weight value(s) of the at least one keyword by determining whether each keyword in the at least one keyword is in the adaptive lexicon; and using the at least one keyword as the input candidate after the at least one keyword is sorted based on the recommendation weight value(s).

In conjunction with the first aspect or any one of the first to the six possible implementation manners of the first aspect, in the eighth possible implementation manner, determining input candidates that match the input content based at least on the one or more keywords includes: obtaining the first keyword set by matching the input content in a default lexicon; obtaining the second keyword set by matching the input content in the adaptive lexicon; increasing recommendation weight values of keywords in both the first keyword set and the second keyword set; and using keywords of the first keyword set and the second keyword set as the input candidates after keywords are sorted based on the recommendation weight values.

In conjunction with the first aspect or any one of the first to sixth possible implementation manners of the first aspect, in the ninth possible implementation manner, determining the input content corresponding to the input operation includes: determining whether word frequencies of candidate keywords corresponding to the character string inputted by the input operation in the default lexicon are less than a preset threshold; if so, determining whether the matching degrees between candidate keywords and any keyword in the adaptive lexicon are greater than a preset matching degree; if not, performing the error correction on the character string; and using the error-corrected character string as the input content.

In conjunction with the first aspect or any one of the first to the six possible implementation manners of the first aspect, in the tenth possible implementation manner, determining input candidates matching the input content based at least on the one or more keywords included in the adaptive lexicon includes performing associative match of the one or more keywords in the adaptive lexicon to determine input candidates.

The second aspect of the present disclosure provides an input device. The input device includes: an acquisition module for obtaining an input operation; a first determination module for determining the input content corresponding to the input operation; and a second determination module for determining, based at least on one or more keywords included in the adaptive lexicon, input candidates that match the input content. Keywords included in the adaptive lexicon are determined based on the current page content of the electronic apparatus.

In conjunction with the second aspect, in the first possible implementation manner, the device further includes: a first acquisition module for acquiring the current page content, extracting keywords meeting a preset word frequency requirement from the current page content, and adding keywords meeting the preset rule to the adaptive lexicon; or a second acquisition module for acquiring the adaptive lexicon from a server based on the identification information of the current page content.

In conjunction with the first possible implementation manner of the second aspect, in the second possible implementation manner, the first acquisition module is further configured for: extracting, from among the keywords included in the current page content, keywords having word frequencies greater than the preset word frequency as keywords meeting the preset rule; and/or extracting keywords of a preset category from among keywords included in the current page content as keywords meeting the preset rule.

In conjunction with the second possible implementation manner of the second aspect, in the third possible implementation manner, the device further includes: a third determination module for determining synonyms for each keyword; and an adjustment module for adjusting word frequencies of corresponding keywords based on synonyms of each keyword.

In conjunction with the third possible implementation manner of the second aspect, in the fourth possible implementation manner, the adjustment module is further configured for adjusting word frequencies of a keyword using the following formula:

$$f = cA + \sum_{i=1 \sim N} c_i * A_i$$

where f represents adjusted word frequency of the keyword, cA represents the word frequency of the keyword before adjustment, $c_i$ represents the similarity value between the keyword and the ith synonym, $A_i$ represents the word frequency of the ith synonym, and N represents the number of synonyms for the keyword.

In conjunction with the second possible implementation manner of the second aspect, in the fifth possible implementation manner, the device further includes: a word segmentation module for performing word segmentation on the current page content by at least two word segmentation tools to obtain at least two word segmentation results corresponding to the at least two word segmentation tools; a merging module for merging the at least two word segmentation results, thereby obtaining keywords included in the current page content.

In conjunction with the second possible implementation manner of the second aspect, in the sixth possible implementation manner, the first acquisition module is further configured for: obtaining the page content of the electronic apparatus that is currently in an open state; or obtaining the page content of the electronic apparatus that is currently in an operated state.

In conjunction with the second aspect, or any one of the first to the six possible implementation manners of the second aspect, in the seventh possible implementation manner, the second determination module includes: a first matching unit, for obtaining at least one keyword by matching the input content in a default lexicon; an adjustment unit, for adjusting the recommendation weight value(s) of the at least one keyword by determining whether each keyword in the at least one keyword is in the adaptive lexicon; and a determination unit, for using the at least one keyword as the input candidate after keywords are sorted based on the recommendation weight value(s).

In conjunction with the second aspect, or any one of the first to the six possible implementation manners of the second aspect, in the eighth possible implementation manner, the second determination module includes: a second matching unit, for obtaining the first keyword set by matching the input content in a default lexicon; a third matching unit, for obtaining the second keyword set by matching the input content in the adaptive lexicon; an increment unit, for increasing recommendation weight values of keywords that are in both the first keyword set and the second keyword set; and a second determination unit for using respective keywords of the first keyword set and the second keyword set as input candidates after the keywords are sorted according to the recommendation weight values.

In conjunction with the second aspect or any one of the first to the six possible implementation manners of the second aspect, in the ninth possible implementation manner, the first determination module includes: a first determination unit for determining whether word frequencies of candidate keywords corresponding to the character string inputted by the input operation in the default lexicon are less than a preset threshold; a second determination unit for determining, if the determination result of the first determining unit is yes, whether the matching degrees between the candidate keywords and any keyword in the adaptive lexicon are greater than a preset matching degree; an error correction unit for performing error correction processing on the character string if the matching degrees between the candidate keywords and any keyword in the adaptive lexicon are not greater than the preset matching degree; and a third determination unit for using the error-corrected character string as the input content.

In conjunction with the second aspect, or any one of the first to the six possible implementation manners of the second aspect, in the tenth possible implementation manner, the second determination module is further configured for performing associative match of the one or more keywords in the adaptive lexicon to determine the input candidate.

The third aspect of the present disclosure provides an electronic apparatus, which includes a memory, and one or more programs. The one or more programs are stored in the memory. The one or more programs with commands for performing the following operations are executed by one or more processors: obtaining an input operation; determining the input content corresponding to the input operation; determining input candidates matching the input content based at least on one or more keywords included in the adaptive lexicon. Keywords included in the adaptive lexicon are determined based on the current page content of the electronic apparatus.

In conjunction with the third aspect, in the first possible implementation manner, the electronic apparatus further executes, by the one or more processors, the one or more programs with commands for performing the following operations: obtaining the current page content; extracting keywords having word frequencies meeting a preset word frequency requirement from the current page content, and adding keywords meeting the preset rule to the adaptive lexicon; or obtaining the adaptive lexicon from a server based on the identification information of the current page content.

In conjunction with the first possible implementation manner of the third aspect, in the second possible implementation manner, the electronic apparatus further executes, by the one or more processors, the one or more programs with commands for performing the following operations: extracting a keyword having word frequency greater than a preset word frequency from among keywords included in the current page content as keywords meeting the preset rule; and/or extracting keywords of a preset category from among keywords included in the current page content as keywords meeting the preset rule.

In conjunction with the second possible implementation manner of the third aspect, in the third possible implementation manner, the electronic apparatus further executes, by the one or more processors, the one or more programs with commands for performing the following operations: identifying synonyms for each keyword; and adjusting word frequencies of corresponding keywords based on synonyms of each keyword.

In conjunction with the third possible implementation manner of the third aspect, in the fourth possible implementation manner, the electronic apparatus further executes, by the one or more processors, the one or more programs with command for performing the following operations: adjusting the word frequency of a keyword using the following formula $$f = cA + \sum_{i=1 \sim N} c_i * A_i$$

where f represents adjusted word frequency of the keyword, cA represents word frequency of the keyword before adjustment, $c_i$ represents the similarity value of the keyword and the ith synonym, $A_i$ represents the word frequency of the ith synonym, and N represents the number of synonyms for the keyword.

In conjunction with the second possible implementation manner of the third aspect, in the fifth possible implementation manner, the electronic apparatus further executes, by the one or more processors, the one or more programs with commands for performing the following operations: separating the current page content by at least two word segmentation tools to obtain at least two word segmentation results corresponding to the at least two word segmentation tools; and merging the at least two word segmentation results to obtain keywords included in the current page content.

In conjunction with the second possible implementation manner of the third aspect, in the sixth possible implementation manner, the electronic apparatus further executes, by the one or more processors, the one or more programs with commands for performing the following operations: obtaining the page content of the electronic apparatus that is currently in an open state; or obtaining the page content of the electronic apparatus that is currently in an operated state.

In conjunction with the third aspect or any one of the first to the six possible implementation manners of the third aspect, in the seventh possible implementation manner, the electronic apparatus further executes, by the one or more processors, the one or more programs with commands for performing the following operations: obtaining at least one keyword by matching the input content in a default lexicon; adjusting the recommendation weight value(s) of the at least one keyword by determining whether each keyword of the at least one keyword is in the adaptive lexicon; and using the at least one keyword as the input candidate after the at least one keyword is sorted based on the recommendation weight value(s).

In conjunction with the third aspect or any one of the first to the six possible implementation manners of the third aspect, in the eighth possible implementation manner, the electronic apparatus further executes, by the one or more processors, the one or more programs with commands for performing the following operations: obtaining the first keyword set by matching the input content in a default lexicon; obtaining the second keyword set by matching the input content in the adaptive lexicon; increasing recommendation weight values of keywords in both the first keyword set and the second keyword set; and using keywords of the first keyword set and the second keyword set as the input candidates after the keywords are sorted based on the recommendation weight values.

In conjunction with the third aspect or any one of the first to the six possible implementation manners of the third aspect, in the ninth possible implementation manner, the electronic apparatus further executes, by the one or more processors, the one or more programs with commands for performing the following operations: determining whether word frequencies of candidate keywords corresponding to the character string inputted by the input operation in the default lexicon are less than a preset threshold; if so, determining whether the matching degree between the candidate keyword and any keyword in the adaptive lexicon is greater than a preset matching degree; if not, performing the error correction on the character string; and using the error-corrected character string as the input content.

In conjunction with the third aspect or any one of the first to the six possible implementation manners of the third aspect, in the tenth possible implementation manner, the electronic apparatus further executes, by the one or more processors, the one or more programs with commands for performing the following operation: performing associative match of the one or more keywords in the adaptive lexicon to determine the input candidates.

The beneficial effects of the disclosure are as follows: after determining the input content corresponding to the input operation, the embodiments of the present disclosure determine input candidates that match the input content based at least on one or more keywords included in the adaptive lexicon. Keywords included in the adaptive lexicon are determined based on the current page content of the electronic apparatus. That is, when determining input candidates, the current page content of the electronic apparatus is considered. Thus the difference of the input scenarios can be considered, thereby achieving the technical effect of providing more accurate input candidates.

DETAILED DESCRIPTION

The present disclosure provides an input method, an input device, and an electronic apparatus to solve the technical problem that the input candidates provided by the input operation are not accurate enough in the existing technologies.

The technical solution in the embodiments of the present disclosure is to solve the above technical problem, and the overall idea is as follows: after determining the input content corresponding to an input operation, determining input candidates matching the input content based at least on one or more keywords included in the adaptive lexicon. Keywords included in the adaptive lexicon is determined based on the current page content of an electronic apparatus. That is, when determining input candidates, the current page content of the electronic apparatus is considered. Thus the difference of the input scenarios can be considered, thereby achieving the technical effect of providing more accurate input candidates.

For better understanding of the above technical solution, the technical solutions of the present disclosure will be described in detail below through the accompanying drawings and specific embodiments. It should be understood that the specific features of the embodiments and the embodiments of the present disclosure are the detailed description of the technical solution of the present disclosure, and are not limitations of the technical solution of the present disclosure. The technical features of the embodiments and the embodiments of the present disclosure may be combined with each other without conflict in the case of no conflict.

Figure 1:
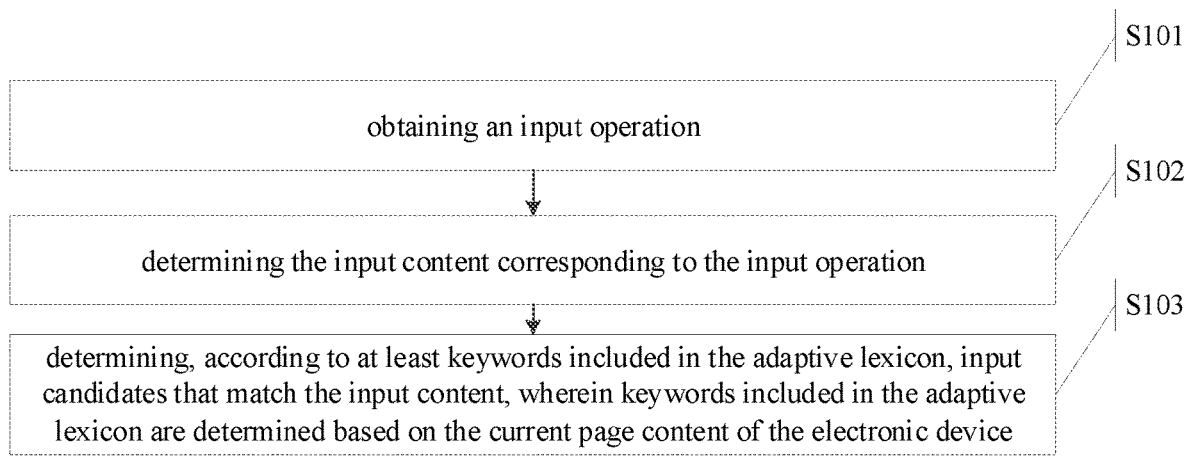
FIG. 1 illustrates a flowchart of an input method consistent with the disclosed embodiments.

In the first aspect, referring to FIG. 1, one embodiment of the present disclosure provides an input method, which includes: S101: obtaining an input operation; S102: determining the input content corresponding to the input operation; S103: determining, based at least on one or more keywords included in the adaptive lexicon, input candidates that match the input content, wherein keywords included in the adaptive lexicon are determined based on the current page content of the electronic apparatus.

For example, the solution is applied to electronic apparatuses with input functions, such as mobile phones, tablets, laptops, personal computers (PCs), or the like.

In step S101, for example, the input operation is an operation of inputting a character string through a button, a touch pad, a voice input device, or other input device. A user generates a touch operation by the following keystrokes on the electronic apparatus: "f", "e", "n", "g", "h", "u", "o". The touch operation generated for these buttons is an input operation, and the input string corresponding to the input operation is "fenghuo". The input operation can also be a selection operation for input candidates. For example: after the user inputs the string, the input method application gives the following input candidates: 1. 烽火 2. 风火 3. 封火 4. 疯. The user generates a selection operation for the above input candidates (for example, inputting the number corresponding to the input candidate, clicking the corresponding input candidates, etc.), and the selection operation is the input operation. For example, if the user performs the selection operation on the candidate 1. 烽火, the selection result is "烽火". Or, when the user calls an input method application, but the string has not been inputted, the electronic apparatus may also provide some input candidates, and the user's selection operation for the input candidates may also be used as an input operation or the like. The input operation may also be other input operation, which is not limited herein.

In step S102, the input content corresponding to the input operation may be determined in various manners, and two of them are described below. In the specific implementation process, the operation manner is not limited to the following two manners.

In the first operation manner, the input operation is directly recognized to obtain the content matching the input operation as the input content. For example, if the input operation is an operation of directly inputting a character string through a button, a touchpad, or other input device, the input character string can be directly recognized as an input content. For example, if the character string inputted by a user through the input operation is fenghuo, the input content can be determined as "fenghuo". For another example, if the input operation is a selection operation for input candidates, the selection result can be used as the input content. For example, the user's selection result for input candidates is "烽火". In this case, the selection result "烽火" can be used as input content, or the like.

In the second operation manner, the input operation is first identified, and the content matching the input operation is obtained. The error correction processing is performed on the content matched by the input operation, thereby obtaining the input content corresponding to the input operation.

For example, if the input operation is an operation of directly inputting a character string through a button, a touch pad, or other input device, the input content may be determined by the following manner: determining whether the word frequencies of candidate keywords in the default lexicon corresponding to the character string inputted by the input operation are less than a preset threshold; if so, determining whether the matching degree of candidate keywords with any keyword in the adaptive lexicon is greater than a preset matching degree; if not, performing error correction processing on the character string; using the error-corrected character string as the input content.

For example, the default lexicon is a system-level lexicon, which includes at least one of the following lexicons: a system lexicon (the default lexicon set by the system), a user lexicon (obtained by learning the user's screen content or the like), a sub-environmental lexicon (a general lexicon for an environment, such as the lexicon for game environments, video environments), or the like. Suppose the input character string is "fneghuo", which can be used to search in the default lexicon. If candidate keywords are not matched, or if candidate keywords are matched but the matching degree is low (for example, below a preset matching value), it can be considered whether the word frequency of candidate keywords in the default thesaurus is less than a preset threshold. It can be further determined whether matching degrees between candidate keywords and any keyword in the adaptive lexicon are greater than a preset matching degree. If matching degrees between candidate keywords and any keyword in the adaptive lexicon are greater than the preset matching degree, it means that although the input string inputted by the input operation does not meet the search requirements of the default lexicon, the input string conforms to the current input environment, so it is not necessary to correct the error. If matching degrees between candidate keywords and any keyword in the adaptive lexicon are not greater than the preset matching degree, it means that the character string inputted by the user does not meet the search requirements of the default lexicon, nor does it conform to the current input environment, so it can be corrected for errors.

In step S103, the adaptive lexicon can be obtained in various manners, and two of them are described below. In the specific implementation process, the operation manners is not limited to the following two manners.

Figure 2:
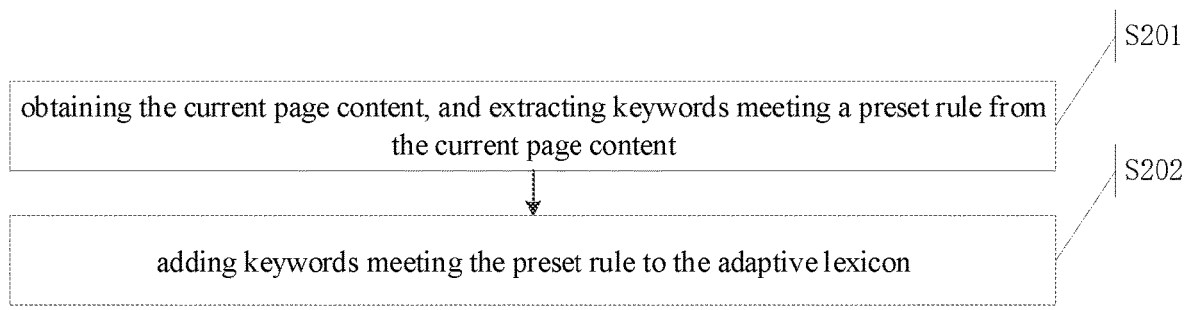
FIG. 2 illustrates a flowchart of determining an adaptive lexicon in an input method consistent with the disclosed embodiments.

Referring to FIG. 2, the adaptive lexicon can be obtained in the following first operation manner: S201: obtaining the current page content, and extracting keywords meeting a preset rule from the current page content; S202: adding keywords meeting the preset rule to the adaptive lexicon.

In step S201, the current page content may be a plurality of types of content, and the manners of obtaining the current page content are also different. The following three types are described. In the specific implementation process, the operation manners are not limited to the following three manners: 1. obtaining the page content of the electronic apparatus that is currently in an open state. For example, if the document A, the document B, and the webpage C are currently open on the electronic apparatus, the content included in the three pages may be used as the current page content. An adaptive lexicon based on the currently open page content can be jointly determined. The solution can provide more comprehensive keywords for the adaptive lexicon. 2: obtaining the page content of the electronic apparatus that is currently in the operated state. For example, the document A, the document B, and the webpage C are currently open on the electronic apparatus. The cursor is currently on the webpage C, indicating that the webpage C is the currently operated page. The webpage C is used as the current page content. The adaptive lexicon can be determined based on the currently operated content, which can provide more accurate keywords for the adaptive lexicon. 3: obtaining the page content corresponding to the user's selection operation as the current page content. For example, after the user performs the input operation, the user may pre-select several documents as the current page content. The page content of the adaptive lexicon can be flexibly set based on the user's needs, so as to more accurately meet the input requirements of the user. 4: obtaining the page content of the electronic apparatus that is currently in the open state. The current page content is determined based on the operation duration of each page content operated by the user. For example, a plurality of page contents (e.g., five, seven, or the like) are opened on the electronic apparatus, and the user's operation time of each page content within the preset time period (e.g., half hour, ten minutes, etc.) can be determined and used to determine the current page content. For example, one or more page contents (e.g., one, two, or the like) with the longest operation time(s) are determined to be the current page content(s). More accurate adaptive lexicon can be provided based on the more active page content, so as to more accurately meet user needs. After the current page content is obtained, the current page content can be segmented to obtain the keywords included in the current page content and the occurrence number of each keyword. The current page content can be segmented by only one word segmentation tool. As an optional embodiment. the method further includes: performing at least two word segmentation tools on the current page content by at least two word segmentation tools to obtain at least two word segmentation results corresponding to the at least two word segmentation tools; merging the at least two word segmentation results, thereby obtaining keywords contained in the current page content.

For example, for a certain page content, suppose that keywords (the number of the occurrences of a keyword is in parentheses) contained in the page content is determined by the word segmentation tool A, which are shown as follows: A1 (100), A2 (30), A3 (151), A4 (114). The word segmentation tool B determines the keywords included in the content of the page, which are shown as follows: A1 (50), B1 (100), B2 (50), A3 (151), A4 (50). The occurrence number of keywords determined based on the two word segmentation results may be summed to determine keywords included in the page content and occurrence numbers thereof: A1 (100+50=150), B1(100), B2 (50), A2 (30), A3 (151+151=302), A4 (114+50=164), or the like. The page content can also be segmented based on other principles, which is not limited herein.

Through the above scheme, the word segmentation results of a plurality of word segmentation tools can be merged, which can avoid the bias of a word segmentation tool. The word segmentation of the page content is more accurate, and a more accurate adaptive lexicon can be established.

In the specific implementation process, a plurality of keywords can be extracted from keywords included in the current page content as keywords meeting the preset rules. The following two examples are described. In the specific implementation process, the operation is not limited to the following two situations.

The manner 1 of extracting keywords meeting a preset rule from the current page content is extracting, from keywords included in the current page content, keyword with word frequencies meeting a preset word frequency requirement as keywords meeting the preset rule.

For example, the occurrence number Nt of each keyword may be first obtained. Then the occurrence number Nt of each keyword may be directly used as the word frequency of the corresponding keyword. Or the word frequency may be obtained after processing the occurrence number Nt. For example, the occurrence number of a word in the current page content is counted to be Nt. The word frequency of the word is the occurrence number Nt divided by the total number T of keywords of the document. Further, for a certain keyword, the word frequency can be obtained by taking the logarithm of Nt/T with 0.985 as base (the value is an empirical value, which is usually used when calculating the word frequency, and another value can be used too). For example, if the occurrence number of a keyword A in the document is 100, and the total number of keywords in the document is 100000, then the unitary keyword frequency of the keyword A is log 0.985 (100/100000). By this calculation, the smaller the word frequency, the more times the word appears. In order to avoid the scale of the environmental adaptive lexicon being too large, the word frequency threshold can be set. Only keywords with word frequencies meeting the preset word frequency requirement are retained in the adaptive lexicon. For example, keywords meeting the preset word frequency requirement are keywords having word frequencies less than the preset value (e.g., 100, 200, etc.). Or keywords meeting the preset rule are keywords before the preset position (e.g., 50, 100, etc.), which are sorted according to word frequencies from low to high. In the specific implementation process, keywords included in the adaptive lexicon determined by the foregoing schemes may be unitary keywords, binary keywords, or higher element keywords, which are not limited herein.

Based on the above schemes, the technical effect that keywords having a high occurrence number can be extracted from the current page content as keywords included in the adaptive lexicon is achieved.

As an optional embodiment, before extracting keywords having word frequencies greater than a preset word frequency from keywords included in the current page content, the method further includes determining synonyms of each keyword, and adjusting word frequencies of corresponding keywords based on synonyms of each keyword.

For example, the word vector of each keyword can be determined, and then the similarity value of the word vectors of the two keywords can be calculated. For example, the similarity value between the two word vectors can be calculated by the angle cosine method or the correlation coefficient method. For each keyword, other keywords having similarity values to that keyword greater than a preset threshold (e.g., 0.5, 0.6, or the like) can be obtained as the synonyms of that keyword. Or other keywords having similarity values to that keyword before a preset position (e.g., 3, 5, or the like) can be obtained as the synonyms of that keyword.

As an optional embodiment, the word frequency of the keyword is adjusted using the following formula:

$$f = cA + \sum_{i=1 \sim N} c_i * A_i$$

where f represents the word frequency of the adjusted keyword, cA represents the word frequency of the keyword before adjustment, $c_i$ represents the similarity value between the keyword and the ith synonym, $A_i$ represents the word frequency of the ith synonym, and N represents the number of synonyms of the keyword.

For example, for any keyword A in the document, synonyms may be first obtained. For example, keyword sets W1, W2 . . . Wn having similarity values to the keyword A greater than a preset threshold X (e.g., 0.85) in the current page content are obtained. As synonyms of the keyword A, the similarity values between these keywords and the keyword A are s1, s2, . . . , sn, respectively. The occurrence frequencies of these keyword words are c1, c2, . . . cn. The corrected frequency of the keyword A is cA+c1*s1+c2*s2+ . . . +c3*s3.

Based on the above scheme, the word frequency of each keyword can be corrected based on synonyms to prevent a plurality synonyms in the current page content. A synonym is eliminated if the word frequency of the synonym does not meet the preset word frequency requirement, thereby improving the accuracy of keywords included in the adaptive lexicon.

The manner 2 of extracting keywords meeting a preset rule from the current page content is extracting keywords of a preset category from among keywords included in the current page content as keywords meeting the preset rule.

For example, the keywords of the preset category are entity words (person name, trade name, place name, or the like). The entity words included in the preset category can be identified by means of entity recognition. The entity words are all used as keywords meeting the preset rule.

Based on the above scheme, the technical effect that keywords of the preset category can be used as keywords included in the adaptive lexicon is achieved.

In addition, in the specific implementation process, the above two methods may also be used in combination. For example, the entity words may be extracted as keywords included in the adaptive lexicon. For other keywords other than the entity words, keywords with word frequencies greater than the preset word frequency can be extracted as the keywords meeting the preset rule.

In addition, in a specific implementation process, after the corresponding adaptive lexicon for each page content is obtained, the adaptive lexicon may also be stored locally in the electronic apparatus or sent to the network server. The adaptive lexicon of the corresponding page content may be found through the identification information of the corresponding page content. The adaptive lexicon does not need to be generated again to improve the efficiency of obtaining the adaptive lexicon and the input efficiency. The identification information is the page content, the summary information (e.g., Hash value) of the content of the page, or the like.

In addition, the adaptive lexicon can also be updated for each page content. For example, for every preset time interval (e.g., 1 day, 1 week, or the like), whether the similarity value between the summary information of a page content and the summary information of the page content in the adaptive lexicon is greater than a preset similarity (for example, 0.85, 0.9, etc.) can be calculated. If the similarity value between the summary information of a page content and the summary information of the page content in the adaptive lexicon is not greater than the preset similarity, the method described above is reused to calculate the adaptive lexicon of the page content. If the similarity value between the summary information of a page content and the summary information of the page content in the adaptive lexicon is greater than the preset similarity, the adaptive lexicon of the page can be kept unchanged.

In the second operation manner, the adaptive lexicon is obtained by acquiring the adaptive lexicon from a server based on the identification information of the current page content.

For example, for each page in the current page content, after obtaining the corresponding adaptive lexicon, the adaptive lexicon may be sent to the server, and the server stores the adaptive lexicon according to the identification information of each page. After current page content is determined, the identifier information may be sent to the server, and the server searches for the corresponding adaptive lexicon based on the identifier information. The identifier information is all the current page content, the summary information of the current page content, or the like.

In S103, input candidates matching the input content may be determined in various manners, and three of them are described below. In the specific implementation process, the operation manner is not limited to the following three manners.

In the first operation manner, determining input candidates that match the input content based at least on one or more keywords included in the adaptive lexicon includes: obtaining at least one keyword by matching the input content in the default lexicon; adjusting the recommendation weight value of the at least one keyword by determining whether each of the at least one keyword is in the adaptive lexicon; using the at least one keyword as the input candidate after keywords are sorted based on the recommendation weight values.

For example, suppose the input content is "fh", and "fh" is matched in the default lexicon. The following keywords are obtained: ① 符合 ("fu he" meaning conform with) ② 返回 ("fan hui" meaning return) ③ 复核 ("fu he" meaning review) ④ 烽火 ("feng huo" meaning needfire) ⑤ 风火 ("feng huo" meaning wind and fire). Whether each of these five keywords is in the adaptive lexicon is judged. Suppose that the keyword ④ 烽火 is determined to be in the adaptive lexicon, the recommendation weight value of each keyword may be adjusted based on ④ 烽火. For example, the recommendation weight value of ④ 烽火 is increased, or the recommendation weight values of keywords outside the adaptive lexicon are decreased, or the like.

In the second operation manner, determining the input candidate matching the input content based at least on one or more keywords included in the adaptive lexicon comprises: obtaining the first keyword set by matching the input content in the default lexicon; obtaining the second keyword set by matching the input content in the adaptive lexicon; increasing recommendation weight value of keywords in both the first keyword set and the second keyword set; using the keywords of the first keyword set and the second keyword set as input candidates after keywords are sorted based on the recommendation weight values.

For example, suppose the input content is "fh", and "fh" is matched in the default lexicon to obtain the following keywords: ① 符合 ② 返回 ③ 复核 ④ 烽火 ⑤ 风火. The first keyword set includes: ① 符合 ② 返回 ③ 复核 ④ 烽火 ⑤ 风火. The following keywords in the adaptive lexicon matching "fh" are obtained: ① 烽火 ② 封火 ("feng huo" meaning block fire) ③ 孵化 ("fu hua" meaning hatch). The second keyword set includes: ① 烽火 ② 封火 ③ 孵化. The keyword in both the first keyword set and the second keyword set is "烽火", and the recommendation weight value of the keyword "烽火" can be increased. For example, "烽火", is recommended as the first candidate, or the like.

In the third operation manner, determining the input candidate that matches the input content based at least on one or more keywords included in the adaptive lexicon includes: matching the input content in keywords included in the adaptive lexicon, and using the matched keywords as input candidates. Further, if matched keywords cannot be obtained, the input content is matched in the default lexicon, thereby obtaining matched keywords as input candidates.

For example, suppose the input content is "fh", and the matched keywords obtained by matching "fh" in the adaptive lexicon include: ① 烽火 ② 封火 ③ 孵化. The three keywords can be used as input candidates. For another example, suppose the input content is "hy", the matching is first performed in the adaptive lexicon using "hy". If the corresponding matching result is not obtained, the "hy" can continue to be matched in the default lexicon. Suppose the following matching result is obtained: ① 还有 ("hai you" meaning and also) ② 很远 ("hen yuan" meaning faraway) ③ 行业 ("hang ye" meaning industry) ④ 会议 ("hui yi" meaning meeting) ⑤ 活跃 ("huo yue" meaning active), the five matched words are provided to a user as input candidates.

In the specific implementation process, when matching the input content in the adaptive lexicon, the input content can be directly matched with the index in the adaptive lexicon, or the associative match can be performed for the input content, thereby obtaining more comprehensive input candidates that better meet the user's needs. There are many ways to do associative match. For example: (1) the prefix association of long entries, that is, the input content (e.g., the pinyin prefix inputted by a user) is first matched with the pinyin (full spell or simple spell form) in the adaptive lexicon to obtain the pinyin of the entries in the adaptive lexicon. Then the corresponding input candidates through the pinyin search in the adaptive lexicon are obtained. For example, a user inputs the pinyin prefix "fh", and matches "fh" with the pinyin of entries in the adaptive lexicon to obtain the pinyin of entries "fhlt", and then obtains keywords matching "fhlt" as input candidates, such as ① 烽火连天 ("feng huo lian tian" meaning needfire is everywhere) ② 肺活量 ("fei huo liang" meaning vital capacity) or the like. (2) collocated association. The scheme is often applied to the case where the adaptive lexicon contains multi-element keywords. If the input content inputted by a user hits the first element (e.g., the left element of a binary keyword) of a multi-element keyword in the adaptive lexicon, the other part of the multi-element keyword can be provided as an input candidate to the user (for example, the right element of the binary keyword), thereby further improving the input efficiency and facilitating user to input fixed collocation.

In the specific implementation process, input candidates matching the input content may be a unary keyword, a binary keyword, and a more-element keyword, which is not limited herein.

Figure 3:
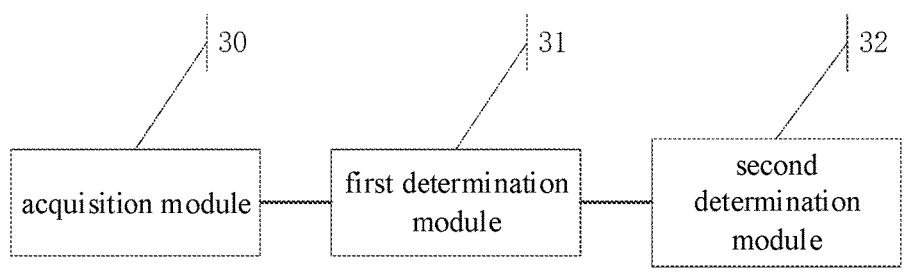
FIG. 3 illustrates a structural diagram of an input device consistent with the disclosed embodiments.

Referring to FIG. 3, the second aspect of the present disclosure provides an input device based on the same concept of the input method. The input device includes an acquisition module 30 for obtaining an input operation, a first determination module 31 for determining the input content corresponding to the input operation, and a second determination module 32 for determining, based at least on one or more keywords included in the adaptive lexicon, input candidates matching the input content. Keywords included in the adaptive lexicon are based on the current page content of an electronic apparatus.

Optionally, the device further includes a first acquiring module for obtaining the current page content, extracting keywords meeting a preset word frequency requirement from the current page content, and adding keyword meeting the preset rule to the adaptive lexicon; or a second acquiring module for obtaining the adaptive lexicon from a server based on the identification information of the current page content.

Optionally, the first acquiring module is configured for extracting, from among keywords included in the current page content, keywords having word frequencies greater than a preset word frequency as keywords meeting the preset rule; and/or extracting keywords of a preset category from among keywords included in the current page content as keywords meeting the preset rule.

Optionally, the device further includes a third determination module for determining synonyms of each keyword, an adjustment module for adjusting word frequencies of corresponding keywords based on synonyms of each keyword.

Optionally, the word frequency of the keyword is adjusted by using the following formula:

$$f = cA + \sum_{i=1 \sim N} c_i * A_i$$

where f represents the word frequency of the adjusted keyword, cA represents the word frequency of the keyword before adjustment, $c_i$ represents the similarity value between the keyword and the ith synonym, $A_i$ represents the word frequency of the ith synonym, and N represents the number of synonyms for the keyword.

Optionally, the device further includes a word segmentation module for performing word segmentation on the current page content by at least two word segmentation tools to obtain at least two word segmentation results corresponding to the at least two word segmentation tools, a merging module for merging the at least two word segmentation results to obtain keywords included in the current page content.

Optionally, the first acquiring module is configured for obtaining the page content of the electronic apparatus that is currently in an open state, or obtaining the page content of the electronic apparatus that is currently in an operated state.

Optionally, the second determination module 32 includes a first matching unit for obtaining at least one keyword by matching the input content in a default lexicon, an adjustment unit for adjusting, by determining whether each of the at least one keyword is in the adaptive lexicon, the recommendation weight value of the at least one keyword, a determining unit, for using at least one keyword as the input candidate after keywords are sorted based on the recommendation weight values.

Optionally, the second determination module 32 includes a second matching unit for obtaining the first keyword set by matching the input content in a default lexicon, a third matching unit for obtaining a second keyword set by matching the input content in the adaptive lexicon, an increment unit for increasing the recommendation weight values of keywords that are in both the first keyword set and the second keyword set, a second determination unit for using the respective keywords of the first keyword set and the second keyword set as input candidates after keywords are sorted based on the recommendation weight values.

Optionally, the first determination module 31 includes a first determining unit for determining whether word frequencies of the candidate keywords corresponding to the character string inputted by the input operation in the default lexicon are less than a preset threshold, a second determination unit for determining whether the determination result of the first determining unit is yes, and whether the matching degrees between the candidate keywords and any keyword in the adaptive lexicon are greater than a preset matching degree, an error correction unit for performing the error correction processing on the character string if matching degrees between the candidate keywords and any keyword in the adaptive lexicon are not greater than a preset matching degree, a third determining unit for using the error-corrected character string as the input content.

Optionally, the second determination module 32 is further configured for performing associative match on the adaptive lexicon by keywords, thereby determining input candidates.

The device described in the second aspect of the present disclosure is the device adopted in the implementation of the input method described in the first aspect of the present disclosure. Based on the input method described in the first aspect of the embodiment of the present disclosure, those skilled in the art can understand the specific structure and modification of the device described in the second aspect of the embodiments of the present disclosure, therefore no further description is provided herein. The devices used to implement the input method described in the first aspect of the embodiments of the present disclosure are all within the protection scope of the present disclosure.

In the third aspect, based on the same inventive concept of the input method, one embodiment provides an electronic apparatus. The device includes a memory, and one or more programs, which are stored in the memory and execute, by the one or more processors, the one or more programs with commands for performing the following operations: obtaining an input operation; determining the input content corresponding to the input operation; determining, based at least on one or more keywords included in the adaptive lexicon, input candidates matching the input content. Keywords included in the adaptive lexicon are determined based on current page content of the electronic apparatus.

Optionally, the electronic apparatus further executes, by the one or more processors, the one or more programs with commands for performing the following operations: obtaining the current page content, extracting keywords having word frequencies meeting a preset word frequency requirement from the current page content, and adding keywords meeting the preset rule to the adaptive lexicon, or obtaining the adaptive lexicon from a server based on the identification information of the current page content.

Optionally, the electronic apparatus further executes, by the one or more processors, the one or more programs with commands for performing the following operations: extracting keywords having word frequencies greater than a preset word frequency from among keywords included in the current page content as keywords meeting the preset rule, and/or, extracting keywords of a preset category from among keywords included in the current page content as keywords meeting the preset rule.

Optionally, the electronic apparatus further executes, by the one or more processors, the one or more programs with commands for performing the following operations: identifying synonyms for each keyword; adjusting word frequencies of the corresponding keywords based on synonyms of each keyword.

Optionally, the electronic apparatus further executes, by the one or more processors, the one or more programs with commands for performing the operation of adjusting the word frequency of a keyword using the following formula:

$$f = cA + \sum_{i=1\sim N} c_i * A_i$$

where f represents the word frequency of the adjusted keyword, cA represents the word frequency of the keyword before adjustment, $c_i$ represents the similarity value between the keyword and the ith synonym, $A_i$ represents the word frequency of the ith synonym, and N represents the number of synonyms for the keyword.

Optionally, the electronic apparatus further executes, by the one or more processors, the one or more programs with commands for performing the following operations: performing word segmentation on the current page content by using at least two word segmentation tools to obtain at least two word segmentation results corresponding to the at least two word segmentation tools, and merging the at least two word segmentation results to obtain keywords included in the current page content.

Optionally, the electronic apparatus further executes, by the one or more processors, the one or more programs with commands for performing the following operations: obtaining the page content of the electronic apparatus that is currently in an open state, or obtaining the page content of the electronic apparatus that is currently in an operational state.

Optionally, the electronic apparatus further executes, by the one or more processors, the one or more programs with commands for performing the following operations: obtaining at least one keyword by matching the input content in a default lexicon, adjusting the recommendation weight value of the at least one keyword by determining whether each keyword in the at least one keyword is in the adaptive lexicon; using the at least one keyword as the input candidate after the at least one keywords are sorted based on the recommendation weight value.

Optionally, the electronic apparatus further executes, by the one or more processors, the one or more programs with commands for performing the following operations: obtaining a first keyword set by matching the input content in a default lexicon, obtaining a second keyword set by matching the input content in the adaptive lexicon, increasing recommendation weight values of keywords in both the first keyword set and the second keyword set, and using the keywords of the first keyword set and the second keyword set as input candidates after keywords are sorted based on recommendation weight values.

Optionally, the electronic apparatus further executes, by the one or more processors, the one or more programs with commands for performing the following operations: determining whether word frequencies of candidate keywords corresponding to the character string inputted by the input operation in the default lexicon are less than a preset threshold; if so, determining whether the matching degrees of candidate keywords and any keyword in the adaptive lexicon are greater than a preset matching degree; if not, the error correction processing is performed on the character string; and using the error-corrected character string as the input content.

Optionally, the electronic apparatus further executes, by the one or more processors, the one or more programs with commands for performing the operation of performing associative match of the one or more keywords in the adaptive lexicon, thereby determining input candidates.

The electronic apparatus used in the third aspect of the present disclosure is the electronic apparatus used in the implementation of the input method described in the first aspect of the present disclosure. Based on the input method described in the first aspect of the embodiment of the present disclosure, those skilled in the art can understand the specific structure and modification of the device described in the third aspect of the embodiments of the present disclosure, therefore no further description is provided herein. The devices used to implement the input method described in the first aspect of the embodiments of the present disclosure are all within the protection scope of the present disclosure.

Figure 4:
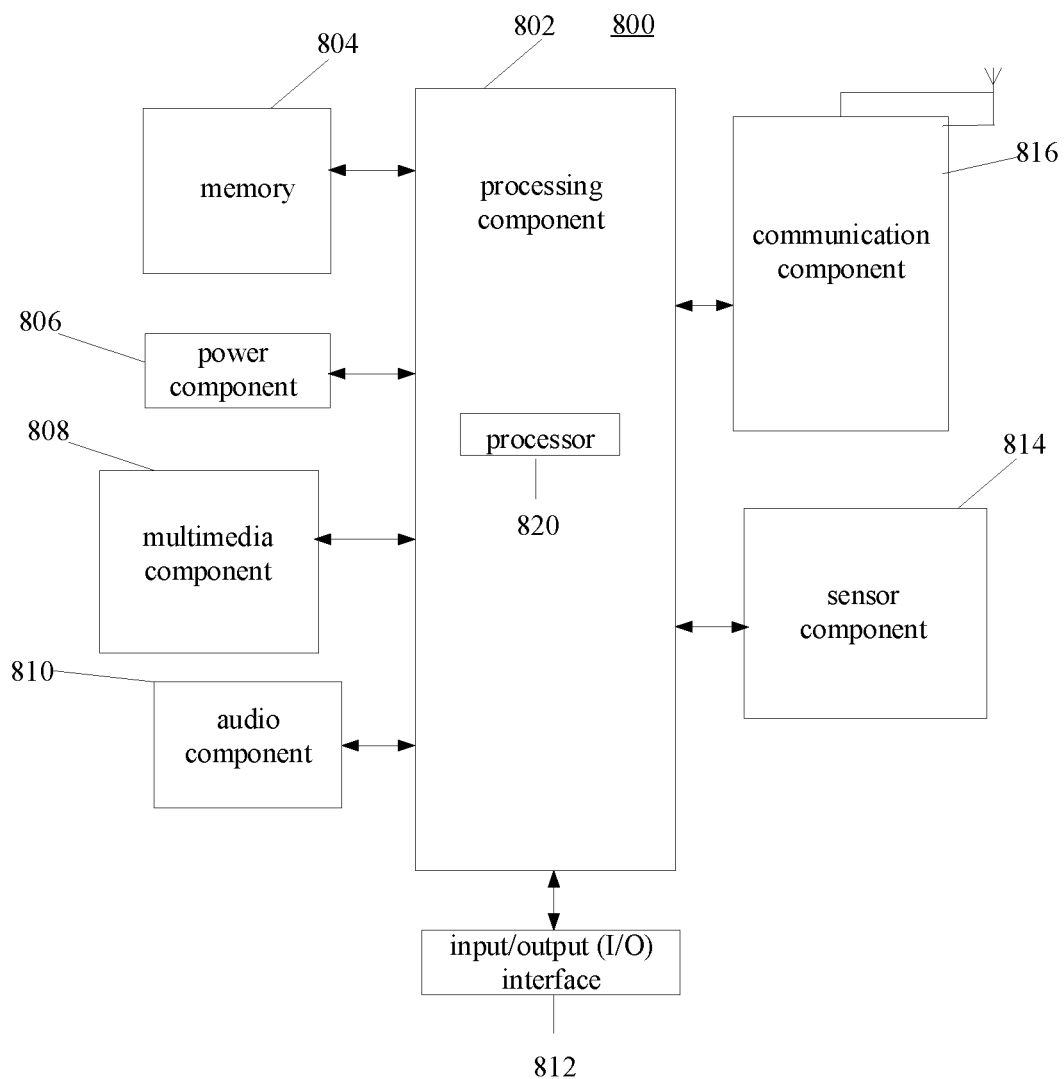
FIG. 4 illustrates a structural diagram of an electronic apparatus implementing an input control method consistent with the disclosed embodiments.

FIG. 4 is a block diagram of an electronic apparatus 800 for an input method provided by one exemplary embodiment. For example, the electronic apparatus 800 can be a mobile phone, a computer, a digital broadcast terminal, a messaging device, a game console, a tablet device, a medical device, a fitness device, a personal digital assistant, or the like.

Referring to FIG. 4, the electronic apparatus 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of electronic apparatus 800, such as operations associated with display, telephone calls, data communications, camera operations, and recording operations. The processing component 802 can include one or more processors 820 to execute commands to perform all or part of the steps of the input method described above. Moreover, the processing component 802 can include one or more modules to facilitate interactions between component 802 and other components. For example, the processing component 802 can include a multimedia module to facilitate interactions between the multimedia component 808 and the processing component 802.

The memory 804 stores various types of data to support operations on the device 800. Examples of such data include commands for operating any applications or methods on electronic apparatus 800, contact data, phone book data, messages, pictures, videos, or the like. The memory 804 can be implemented by any type of volatile or non-volatile storage device, or a combination thereof, such as a static random access memory (SRAM), an electrically erasable programmable read only memory (EEPROM), an erasable Programmable read only memory (EPROM), a programmable read only memory (PROM), a read only memory (ROM), a magnetic memory, a flash memory, a disk or an optical disk.

The power component 806 provides power to various components of the electronic apparatus 800. The power component 806 can include a power management system, one or more power sources, and other components associated with generating, managing, and distributing power for the electronic apparatus 800.

The multimedia component 808 includes a screen that provides an output interface between the electronic apparatus 800 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide action. In some embodiments, the multimedia component 808 includes a front camera and/or a rear camera. When the electronic apparatus 800 is in an operation mode, such as a shooting mode or a video mode, the front camera and/or the rear camera can receive external multimedia data. Each front and rear camera can be a fixed optical lens system or have focal length and optical zoom capability.

The audio component 810 outputs and/or inputs an audio signal. For example, the audio component 810 includes a microphone (MIC) that receive external audio signals such as a call mode, a recording mode, and a voice recognition mode when the electronic apparatus 800 is in an operational mode. The received audio signal may be further stored in the memory 804 or be transmitted via the communication component 816. In some embodiments, the audio component 810 also includes a speaker for outputting an audio signal.

The I/O interface 812 provides interfaces between the processing component 802 and an external interface module, which may be a keyboard, a click wheel, a button, or the like. The buttons may include, but are not limited to, a home button, a volume button, a start button, and a lock button.

The sensor component 814 includes one or more sensors for providing the electronic apparatus 800 with status assessments of various aspects. For example, the sensor component 814 can detect an open/closed state of the device 800, relative positioning of components. For example, the components are a display and a keypad of electronic apparatus 800. The sensor component 814 can also detect the position change of a component of the electronic apparatus 800 or the electronic apparatus 800, the presence or absence of contact of the user with the electronic apparatus 800, the orientation or acceleration/deceleration of the electronic apparatus 800, and the temperature change of the electronic apparatus 800. The sensor component 814 can include a proximity sensor for detecting the presence of nearby objects without any physical contact. The sensor assembly 814 may also include a light sensor, such as a CMOS or CCD image sensor for imaging applications. In some embodiments, the sensor component 814 can also include an acceleration sensor, a gyro sensor, a magnetic sensor, a pressure sensor, or a temperature sensor.

The communication component 816 facilitates wired or wireless communication between the electronic apparatus 800 and other devices. The electronic apparatus 800 can access a wireless network based on a communication standard, such as WiFi, 2G or 3G, or a combination thereof. In one exemplary embodiment, the communication component 816 receives broadcast signals or broadcast associated information from an external broadcast management system via a broadcast channel. In another exemplary embodiment, the communication component 816 also includes a near field communication (NFC) module to facilitate short range communications, which can be implemented based on radio frequency identification (RFID) technology, infrared data association (IrDA) technology, ultra-wideband (UWB) technology, Bluetooth (BT) technology and other technologies.

In one exemplary embodiment, the electronic apparatus 800 performs the above input method, which may be implemented by one or more application specific integrated circuits (ASICs), digital signal processors (DSPs), digital signal processing devices (DSPDs), programmable logic devices (PLDs), Programming gate array (FPGA), controller, microcontroller, microprocessor or other electronic components.

In an exemplary embodiment, a non-transitory computer readable storage medium with commands is provided such as a memory 804 with commands executable by the processor 820 of the electronic apparatus 800 to perform the above input method. For example, the non-transitory computer readable storage medium may be a ROM, a random access memory (RAM), a CD-ROM, a magnetic tape, a floppy disk, an optical data storage device or the like.

A non-transitory computer readable storage medium, when commands in the storage medium are executed by a processor of an electronic apparatus, enables an electronic apparatus to perform an input method comprising: obtaining an input operation; determining the input content corresponding to the operation; determining, according to at least a keyword included in the adaptive lexicon, input candidates matching the input content. Keywords included in the adaptive lexicon are determined based on the current page content of the electronic apparatus.

Figure 5:
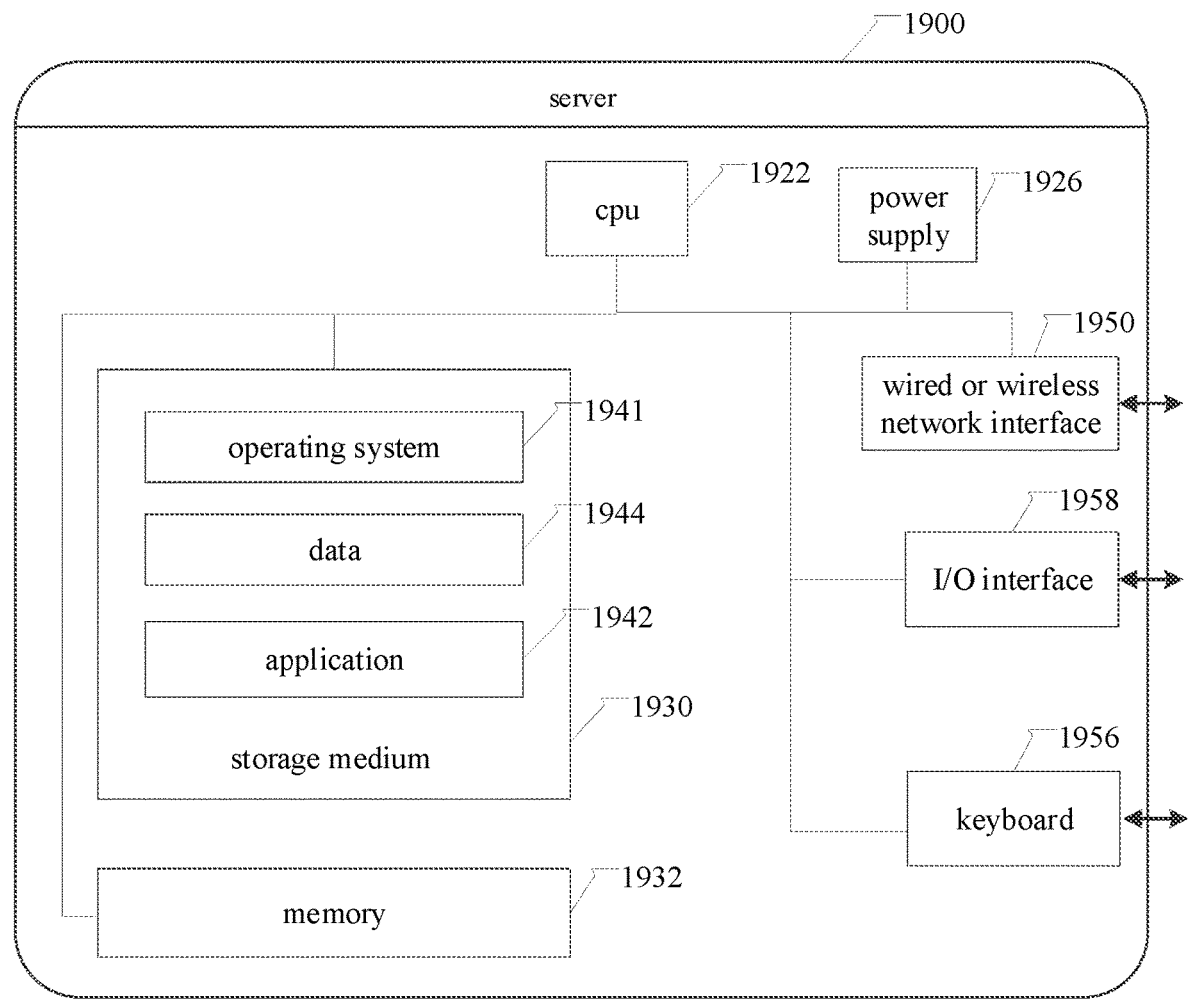
FIG. 5 illustrates a structural diagram of a server consistent with the disclosed embodiments.

FIG. 5 is a structural diagram of a server in one embodiment. The server 1900 can vary considerably because of different configurations or performances, and can include one or more central processing units (CPUs) 1922, a memory 1932, one or more storage medium 1942 or storage medium (e.g. mass storage device) 1930 of data 1944. The memory 1932 and the storage medium 1930 may be short-term storage or persistent storages. The programs stored on storage medium 1930 may include one or more modules (not shown), each of which may include a series of command operations on the server. Further, the central processor 1922 can communicate with the storage medium 1930 to execute a series of command operations of the storage medium 1930 on the server 1900.

The server 1900 may also include one or more power supplies 1926, one or more wired or wireless network interfaces 1950, one or more input and output interfaces 1958, one or more keyboards 1956, and/or one or more operating systems 1941, such as Windows Server™, Mac OS X™, Unix™, Linux™, FreeBSD™, or the like.

Figure 6:
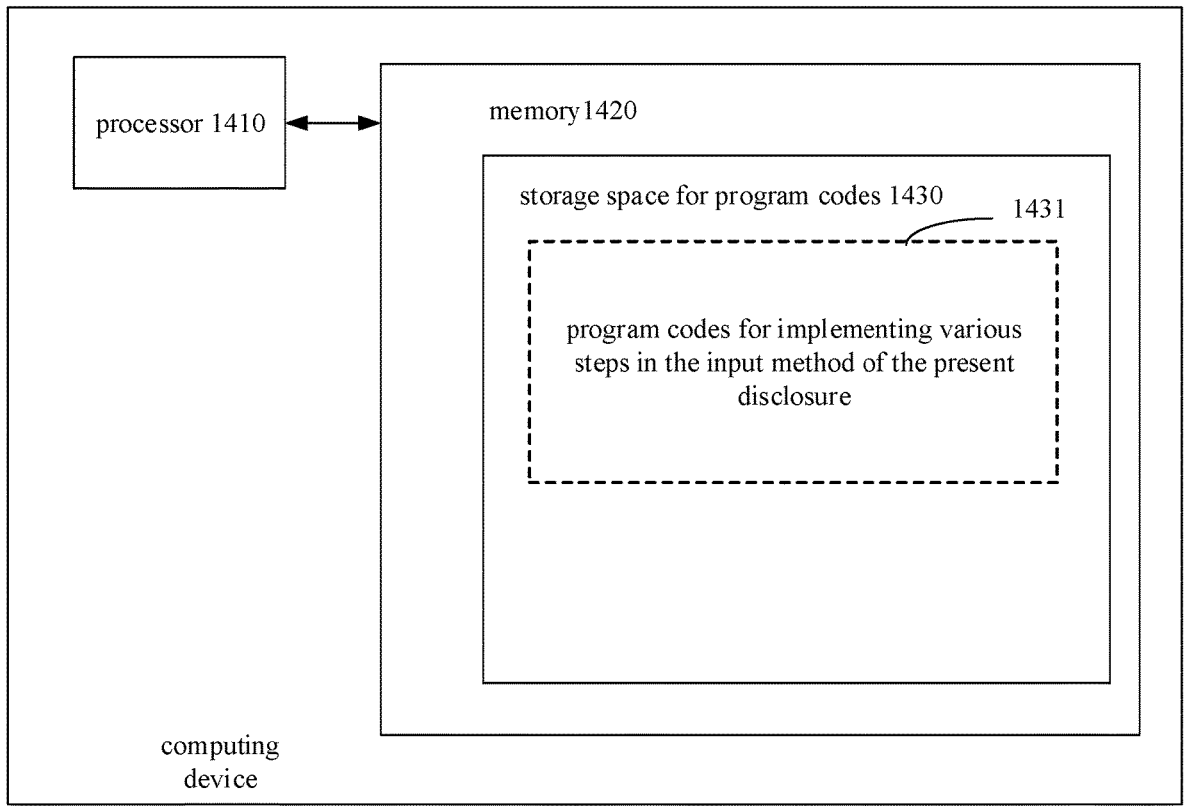
FIG. 6 illustrates a block diagram of an electronic apparatus for performing an input method consistent with the disclosed embodiments.
Figure 7:
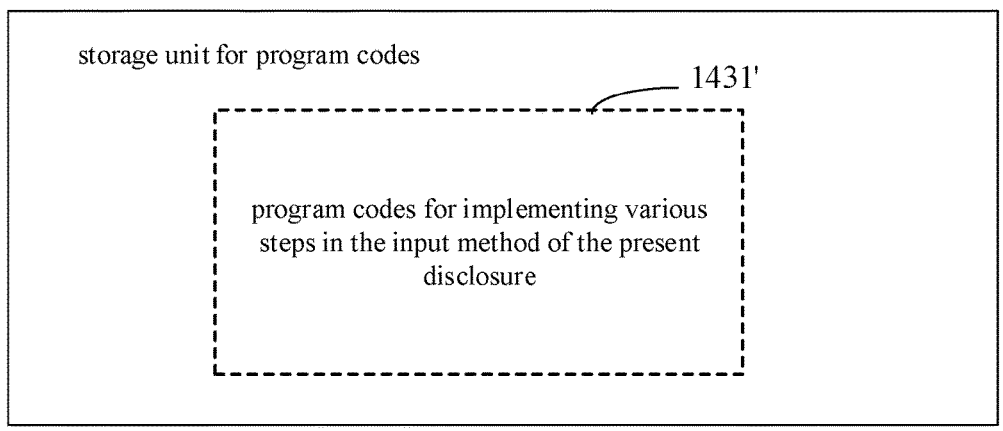
FIG. 7 illustrates a storage unit for holding or carrying program codes for implementing an input method consistent with the disclosed embodiments.

FIG. 6 shows an electronic apparatus for performing the input method in one embodiment. The electronic apparatus conventionally includes a processor 1410 and a program product or readable medium in the form of a memory 1420. The memory 1420 may be an electronic memory such as a flash memory, an EEPROM (Electrically Erasable Programmable Read Only Memory), an EPROM, or a ROM. The memory 1420 has a memory space 1430 for the program codes 1431 to perform any step of the methods described above. For example, the storage space 1430 for program codes may include various program codes 1431 for respectively implementing various steps in the above methods. These program codes can be read from or written to one or more program products. These program products include program code carriers such as memory cards. Such program product is typically a portable or fixed storage unit as described with reference to FIG. 7. The storage unit may have a storage section, a storage space, or the like arranged similarly to the storage 1420 in the electronic apparatus of FIG. 6. Program codes can be compressed in an appropriate form. Typically, the storage unit includes readable code 1431'. That is, codes can be read by a processor such as the processor 1410. When the codes are executed by an electronic apparatus, the electronic apparatus performs various steps of the input method described above.

In the embodiments of the present disclosure, after determining the input content corresponding to an input operation, the input candidate matching the input content is determined based at least on one or more keywords included in the adaptive lexicon, Keywords included in the adaptive lexicon are determined based on the current page content of the electronic apparatus. That is, when determining input candidates, the current page content of the electronic apparatus is considered, that is, the difference of input scenarios can be considered, thereby achieving the technical effect of providing more accurate input candidates.

Those skilled in the art should understand that embodiments of the present disclosure can be provide methods, systems, or computer program products. The application can take the form of an entirely hardware embodiment, an entirely software embodiment, or a combination of software and hardware. Moreover, the disclosure can take the form of a computer program product embodied on one or more computer usable storage media (including but not limited to disk storage, CD-ROM, optical storage, or the like) with computer usable program code is embodied.

The present disclosure is described with reference to flowchart illustrations and/or block diagrams of methods, apparatus (systems), and computer program products according to embodiments of the present disclosure. It will be understood that each flow and/or block of the flowcharts and/or block diagrams, and combinations of flows and/or blocks in the flowcharts and/or block diagrams can be implemented by computer program commands. The computer program commands can be provided to a processor of a general purpose computer, a special purpose computer, an embedded processor, or other programmable data processing device to generate a device for implementing the functions specified in one or more flows in a flowchart and/or one or more blocks of a block diagram by commands executed by processors of a computer or other programmable data processing device.

The computer program commands can also be stored in a computer readable memory that can direct a computer or other programmable data processing device to operate in a particular manner, so that commands stored in the computer readable memory produce a manufacture with a command device. The command device implements the functions specified in one or more flows in a flowchart and/or one or more blocks of a block diagram.

These computer program commands can also be loaded onto a computer or other programmable data processing device, so that a series of operational steps are performed on the computer or other programmable device to produce computer-implemented processing. Thus the commands executed on the computer or other programmable device provide steps for implementing the functions specified in one or more flows in a flowchart and/or one or more blocks of a block diagram.

Although the embodiments of the present disclosure have been described, it will be apparent that those skilled in the art can make various changes and modifications to the embodiments. The appended claims cover all such changes and modification that are all in the protection scope of the disclosure.

Apparently, those skilled in the art that various modifications and variations can be made in the present disclosure without departing from the spirit and scope of the disclosure. Thus, if such modifications and variations of the present disclosure are within the scope of the claims and the equivalents, the present disclosure is also intended to include such modifications and variations.

What is claimed is:

1. An input method, comprising:
obtaining an input operation;
determining an input content corresponding to the input operation;
obtaining a first keyword set by matching the input content in a default lexicon;
obtaining a second keyword set by matching the input content in an adaptive lexicon, the adaptive lexicon including one or more keywords determined based on a current page content of an electronic apparatus;
increasing a recommendation weight value of a keyword in both the first keyword set and the second keyword set; and
determining the keywords of the first keyword set and the second keyword set as input candidates that match the input content after the keywords are sorted according to the recommendation weight values.

2. The method according to claim 1, further comprising:
obtaining the current page content; extracting keywords having word frequencies meeting a preset word frequency requirement from the current page content, and adding the keywords meeting a preset rule to the adaptive lexicon; or
obtaining the adaptive lexicon from a server based on identification information of the current page content.

3. The method according to claim 2, wherein extracting the keywords meeting the preset rule from the current page content comprises:
extracting, from the keywords included in the current page content, keywords having word frequencies greater than a preset word frequency as the keywords meeting the preset rule; and/or
extracting keywords of a preset category from the keywords included in the current page content as the keywords meeting the preset rule.

4. The method according to claim 3, wherein before extracting the keywords having the word frequencies greater than the preset word frequency from the keywords included in the current page content as the keywords meeting the preset rule, the method further comprises:
identifying synonyms for each keyword;
based on the synonyms for each keyword, adjusting a word frequency of the corresponding keyword.

5. The method according to claim 4, wherein the word frequency of a keyword using the following formula:

$$f = cA + \sum_{i=1 \sim N} c_i * A_i$$

wherein f represents the word frequency of the keyword after adjustment, cA represents the word frequency of the keyword before adjustment, $c_i$ represents a similarity value between an ith synonym and the key word, $A_i$ represents a word frequency of the ith synonym, and N represents a number of the synonyms for the keyword.

6. The method according to claim 3, further comprising:
performing word segmentation on the current page content by at least two word segmentation tools to obtain at least two word segmentation results corresponding to the at least two word segmentation tools;
merging the at least two word segmentation results to obtain the keywords included in the current page content.

7. The method according to claim 3, wherein obtaining the current page content comprises at least one of:
obtaining a page content of the electronic apparatus that is currently in an open state; or obtaining a page content of the electronic apparatus that is currently in an operated state.

8. The method according to claim 1, wherein determining the input content corresponding to the input operation comprises:
determining whether a word frequency of a candidate keyword corresponding to a character string inputted by the input operation in the default lexicon is less than a preset threshold;
if so, determining whether a matching degree between the candidate keyword and any keyword in the adaptive lexicon is greater than a preset matching degree;
if not greater than the preset matching degree, performing error correction on the character string;
using error-corrected character string as the input content.

9. The method according to claim 1, further comprising:
performing associative match of the one or more keywords on the adaptive lexicon to determine the input candidates.

10. An electronic apparatus, comprising a memory, and one or more programs, wherein the one or more programs are stored in the memory and being configured to execute, by one or more processors, the one or more programs with commands for performing following operations:
obtaining an input operation;
determining an input content corresponding to the input operation;
obtaining a first keyword set by matching the input content in a default lexicon;
obtaining a second keyword set by matching the input content in an adaptive lexicon, the adaptive lexicon including one or more keywords determined based on a current page content of an electronic apparatus;
increasing a recommendation weight value of a keyword in both the first keyword set and the second keyword set; and
determining the keywords of the first keyword set and the second keyword set as input candidates that match the input content after the keywords are sorted according to the recommendation weight values.

11. The apparatus according to claim 10, wherein the one or more processors are further configured to execute the one or more programs to perform:
obtaining the current page content; extracting keywords having word frequencies meeting a preset word frequency requirement from the current page content, and adding the keywords meeting a preset rule to the adaptive lexicon; or
obtaining the adaptive lexicon from a server based on identification information of the current page content.

12. The apparatus according to claim 11, wherein extracting the keywords meeting the preset rule from the current page content comprises:
extracting, from the keywords included in the current page content, keywords having word frequencies greater than a preset word frequency as the keywords meeting the preset rule;
and/or extracting keywords of a preset category from the keywords included in the current page content as the keywords meeting the preset rule.

13. The apparatus according to claim 12, wherein before extracting the keywords having the word frequencies greater than the preset word frequency from the keywords included in the current page content as the keywords meeting the preset rule, the method further comprises:
identifying synonyms for each keyword;
based on the synonyms for each keyword, adjusting a word frequency of the corresponding keyword.

14. The apparatus according to claim 13, wherein the word frequency of a keyword using the following formula:

$$f = cA + \sum_{i=1\sim N} c_i * A_i$$

wherein f represents the word frequency of the keyword after adjustment, cA represents the word frequency of the keyword before adjustment, $c_i$ represents a similarity value between an ith synonym and the key word, $A_i$ represents a word frequency of the ith synonym, and N represents a number of the synonyms for the keyword.

15. The apparatus according to claim 11, wherein the one or more processors are further configured to execute the one or more programs to perform:
performing word segmentation on the current page content by at least two word segmentation tools to obtain at least two word segmentation results corresponding to the at least two word segmentation tools;
merging the at least two word segmentation results to obtain the keywords included in the current page content.

16. The apparatus according to claim 10, wherein obtaining the current page content comprises at least one of:
obtaining a page content of the electronic apparatus that is currently in an open state; or
obtaining a page content of the electronic apparatus that is currently in an operated state.

17. A non-transitory storage medium storing computer-readable instructions that, when being executable by at least one processor, cause the at least one processor to perform:
obtaining an input operation;
determining an input content corresponding to the input operation;
obtaining a first keyword set by matching the input content in a default lexicon;
obtaining a second keyword set by matching the input content in an adaptive lexicon, the adaptive lexicon including one or more keywords determined based on a current page content of an electronic apparatus;
increasing a recommendation weight value of a keyword in both the first keyword set and the second keyword set and determining the keywords of the first keyword set and the second keyword set as input candidates that match the input content after the keywords are sorted according to the recommendation weight values.

* * * * *